May 2, 1961 W. C. THOMPSON 2,982,024
STRESS ELIMINATOR FOR PARTIAL DENTURES
Filed June 15, 1959

INVENTOR,
WILLIAM C. THOMPSON;
BY
ATTORNEY

United States Patent Office 2,982,024
Patented May 2, 1961

2,982,024
STRESS ELIMINATOR FOR PARTIAL DENTURES
William C. Thompson, Gardena, Calif.
(18009 Ardath Ave., Torrance, Calif.)
Filed June 15, 1959, Ser. No. 820,290
6 Claims. (Cl. 32—7)

The present invention relates to what I term to be a stress eliminator for partial dentures. It is common in the practice of dentistry to supply missing natural teeth with a denture anchored in various ways to natural teeth. When one loses, by removal, certain natural teeth such as the first, second and third molars on either side of the jaw, it is customary to supply a denture of some form carrying artificial molars as a replacement. I am assuming, for the purpose of illustration only, that the lower jaw has lost the first, second and third molars from each side and that artificial teeth replacement is necessary. Under these conditions, it is customary to use what is termed a lingual bar, which is a curved bar, fitting closely behind the incisors, cuspid, and first bicuspid teeth. As a rule, the lingual bar carries what is termed a clasp at each end thereof which clasp engages the second bicuspid teeth for holding the lingual bar in position. To the clasp is secured, in various ways, the partial dentures, which dentures include a saddle adapted to overlie the edentulous area of the jaw. As is generally known, the edentulous area is the tissue and ridge area. When occlusion occurs, considerable pressure results between the upper and lower molars. This pressure forces the saddle downwardly over the edentulous area and unless this pressure is relieved, blood flow to this area is stopped causing trauma and absorption of the tissue. When this results, the partial dentures settle out of occlusion with the upper opposing teeth.

It becomes apparent, in modern dentistry, that it is very important that the denture be properly fitted within the mouth and to the natural teeth in such a manner that attachment to the natural teeth will not cause deterioration thereof. This may result from movement of the saddle carrying the artificial teeth which causes stress upon the natural teeth and particularly the natural teeth abutting the partial denture. To maintain the integrity of the natural teeth and particularly the natural teeth abutting the partial denture, various and sundry means of connection therebetween have been proposed by various dentists. To mention a few, it has been proposed to utilize a type of hinge between the clasp which connects a natural tooth and the denture. Such a hinge allows movement of the denture and imposes a stress upon the natural tooth. Others have proposed to use a connection which allows a vertical movement between the denture and the natural tooth. However, in both instances just mentioned, damage to the natural tooth sooner or later results due to imposed stresses.

An object of the present invention is to provide a partial denture stress eliminator which overcomes stress on the natural abutment tooth resulting upon any movement of the partial denture.

A further object is the provision of a stress eliminator for partial dentures so constructed and arranged as to prevent trauma in the ridge and tissue of the jaw from which natural teeth have been removed when a partial denture overlies the ridge and tissue.

A further object is a stress eliminator which when secured to a natural tooth, so holds a partial denture that said denture does not settle out of occlusion with opposing teeth.

Further objects include a stress eliminator for partial dentures which is inexpensive in cost to manufacture, positive in its action, easily fabricated, and generally superior to stress eliminators now known to the inventor.

With the above mentioned and other objects in view, the invention consists in the novel and useful provision, formation, construction, association and relative arrangement of parts, members and features, all as shown in one embodiment in the accompanying drawing, described generally and more particularly pointed out in the claims.

Figure 1:
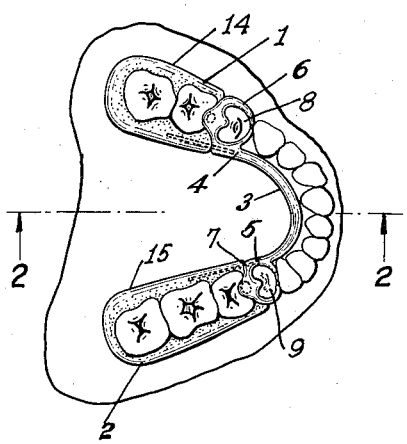
Figure 1 is a plan view of the teeth of the lower jaw of a human, showing partial dentures for each side of the jaw, and embodying the invention.

Referring now to the drawing, in Figure 1 I have shown a lower jaw with two partial dentures 1 and 2 one for each side of the jaw. The partial denture at 1 has a replacement of two molars; to wit: the second and third molars, while the partial denture 2 has a replacement of the first, second and third molars. The partial dentures are for illustrative purpose only and to show a dental restoration where natural teeth still remain, the remaining natural teeth for one jaw side being the central and lateral incisors, the cuspid, and first and second bicuspids. In the case of the opposite side of the jaw, the second and third molars are artificial. Regardless of the number of natural teeth, the present invention performs efficiently and without any danger to the natural teeth by use of my invention for securing the partial dentures.

Figure 2:
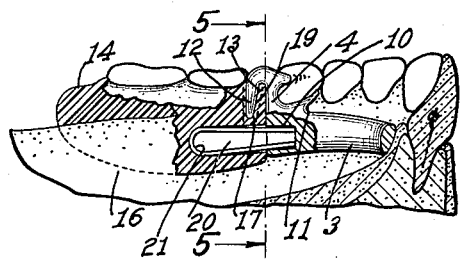
Figure 2 is a fragmentary, cross-sectional view on the line 2—2 of Figure 1, and on an enlarged scale.
Figure 3:
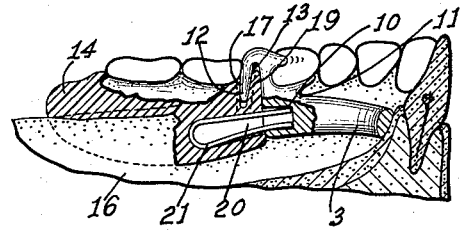
Figure 3 is a view similar to that of Figure 2, the partial denture being in moved position from that of Figure 2.
Figure 4:
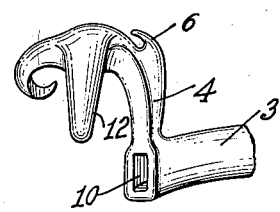
Figure 4 is a fragmentary, perspective view, on an enlarged scale, of a lingual bar and clasp employed in the present invention.
Figure 6:
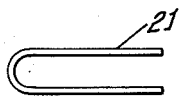
Figure 6 is a plan view of a spring member utilized in the practice of the invention; and, Figure 7 is a screen which may be incorporated in the practice of the invention.

Referring to Figures 2, 3 and 4, a lingual bar 3 is provided at its ends with vertical posts 4 and 5, terminating in clasps 6 and 7. Each clasp takes the form shown in Figure 4 and embraces in part a natural tooth, in the present instance the first molar 8 for one side of the jaw and for the opposite side of the jaw the second bicuspid 9. As clasps are well known in the art, the clasps will not be detailed as to structure and reference is made to the drawing. A clasp as used in dentistry, may be defined as a round or half round metal member encircling or partially encircling a tooth for the purpose of aiding the retention of dentures or removable bridges. As a rule, clasps are precision instrumentalities. Each post and clasp have identical form, as do likewise, the partial dentures, and, therefore, the clasp shown at 6 will be described in its relationship to the partial denture shown at 1. The lingual bar is formed with an outwardly opening bore 10 at each end. Under certain conditions this bore may be in the post 4, however, the lingual bar is increased in thickness near its ends where it joins the clasps, as illustrated in Figures 2 and 3 at 11. This is in order to strengthen the lingual bar and end portions thereof at the zone of the posts such as 4. The bore 10 is angular sided, and in the present instance, rectangular in cross section. The clasp 4 is provided with a dowel or post 12. This dowel or post depends from the clasp and may be conical in form or pyramidal. In either case, the dowel or post is inverted with the base end thereof carried by the clasp. The clasp is formed so as to space the dowel or post 12 from the post 4, as shown in Figures 2 and 3 at 13. It is to be noted that the dowel or post 12 is centered and parallel to the long axis of the abutment tooth 8 in one instance and 9 in the second instance. In this connection, the bore 10 in the lingual bar is at one side of the dowel or post 12 and the long axis of tooth 8.

Figure 5:
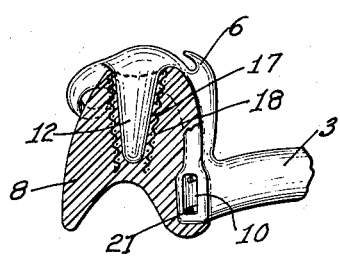
Figure 5 is a fragmentary cross sectional view, on an enlarged scale, and taken on the line 5—5 of Figure 2.
Figure 7:
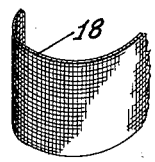

I shall not attempt a dissertation on dental prosthesis other than to say that properly fitting saddles 14 and 15 for the edentulous area 16 are provided, which saddles carry the artificial teeth of the partial dentures, as shown. Usually a saddle, in modern dentistry, is formed from an acrylic resin. During the formation of a saddle, the saddle is formed with a bore complementary to the shape of the dowel or post 12, see Figure 2, 3 and 5 at 17. In the formation of this hole, I have found it expedient to surround the dowel or post 12 with a fine wire screen of the type shown in Figure 7 at 18, and then in the process of forming the hole, mold the screen into the acrylic resin for the purpose of reinforcement at this zone. Likewise, during the formation of the saddle, the proximal end of the saddle, being the end 19, is in abutting relationship to the post 4; i.e., the distal portion of said post. The proximal end 19 of the saddle is provided with a longitudinal bore 20 in substantially axial alignment with bore 10 in the lingual bar. Adapted for reception within the bore 20 is a U-shaped member 21 formed of spring wire. The curved end of the member 21 is received within the bore 20 and may be permanently positioned therein when the acrylic resin of the saddle is cured leaving two of the leg portions extending from the proximal end of the partial denture for reception within the bore 10, as illustrated in Figures 2 and 3.

The operation, uses and advantages of my invention, are as follows.

Referring to Figures 2 and 3, the distal end of the abutment tooth, as well as the distal end of the clasp and its post 4, are in abutting engagement with the proximal end of the denture. The dowel or post 12 for each side of the denture is received within a reinforced bore 17 and the ends of the two legs of each U-shaped spring member 21 are received within the bores 10 of the lingual bar. When occlusion occurs, pressure of the upper molars against the artificial molars of the lower jaw forces the saddles downwardly from the position of Figure 2 to that of Figure 3. This movement is slight, however, it is sufficient to cause the saddles to move relative to the dowels or posts 12 in the bores 17. This movement of a saddle affects the separation between the legs of the U-shaped spring member 20. In other words, the two legs of said spring member are flexed closer together, as shown in Figure 3. The moment that occlusional pressure is removed from the partial denture, the legs of the spring member separate and in so doing, move the saddle of the partial denture from the position of Figure 3 to that of Figure 2. During this movement, the denture is guided vertically by the dowel or post 12 within the bore 13, and this movement is parallel to, and centered relative to the long axis of the abutment tooth 8.

Thus, I have eliminated occlusional disharmonies, and have established balanced articulation and removed all stress from the abutment tooth 8. Of course, the same is true for the opposite side of the jaw. It might be thought by some, that if one attempted occlusion for one side of the jaw only, that a twist might result in the lingual bar and the clasp. However, this is not true as the clasp does not move, only the partial denture, and it moves straight upwardly and downwardly due to the dowel or post 12 fit within the bore 13. Consequently, only the partial denture, regardless of which side of the jaw it is on, moves. This movement of the partial denture upwardly assures that blood supply to the ridge and tissue is not cut off.

I claim:

1. The combination, with a lingual bar provided with a clasp for attachment to a natural tooth and a partial denture, of: means between the clasp and the denture for guiding movement of the denture vertically in centered relationship to the long axis of the natural tooth, and spring means between the denture and the lingual bar normally tending to raise the denture vertically.

2. The combination with a lingual bar provided with a clasp for attachment to a natural abutment tooth and a partial denture of: a pair of spring arms extending from the partial denture, the extended spring arms being received within said lingual bar.

3. In combination, a lingual bar provided at one end with a post and a clasp carried on said post for connection with a natural tooth, said clasp provided with a dowel spacedly depending from the clasp, a partial denture, one end of which abuts the said post and lingual bar, the said denture provided with a reinforced hole for receiving the dowel in such a manner as to allow vertical movement of the denture, the said dowel and hole being centered relative to the long axis of the abutment tooth, and spring means between the lingual bar and the denture adapted to move the denture vertically upwardly for reception of the dowel within the hole.

4. The device as set forth in claim 3, characterized in that the dowel is of tapered form and the hole in the partial denture is complementary to the dowel form.

5. The device as set forth in claim 3, said spring means comprising: a U-shaped wire, the U-shaped end of which is embedded within the partial denture with leg portions thereof extending outwardly from that end of the partial denture abutting the natural tooth to which the clasp is attached, the said lingual bar being formed with a hole for receiving said extended ends.

6. The device as set forth in claim 5, the hole being in one end of the lingual bar and having a section adapted to confine the ends of the U-shaped wire spring in such a manner as to allow flexion of the wire legs.

References Cited in the file of this patent

UNITED STATES PATENTS 2,483,353     Seveilhac et al. _____ Sept. 27, 1949

OTHER REFERENCES

"Will Gold Stress Relieving Bars," Oral Hygiene, page 1140, May 1930.